(12) United States Patent
Sip et al.

(10) Patent No.: US 7,889,483 B2
(45) Date of Patent: Feb. 15, 2011

(54) ELECTRONIC DEVICE WITH SLIDABLE KEYBOARD

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/610,348

(22) Filed: Nov. 2, 2009

(65) Prior Publication Data

US 2010/0311479 A1 Dec. 9, 2010

(30) Foreign Application Priority Data

Jun. 3, 2009 (CN) .......................... 2009 1 0302872

(51) Int. Cl.
*H05K 5/00* (2006.01)
*H05K 7/00* (2006.01)
*H04M 1/00* (2006.01)

(52) U.S. Cl. ............................ 361/679.11; 361/679.09; 361/679.14; 455/575.1; 455/575.4

(58) Field of Classification Search ............ 361/679.09, 361/679.11, 679.14; 455/575.1, 575.4
See application file for complete search history.

(56) References Cited

U.S. PATENT DOCUMENTS

| | | | | |
|---|---|---|---|---|
| 5,978,215 | A | * | 11/1999 | Chiu et al. ............. 361/679.11 |
| 7,006,015 | B2 | * | 2/2006 | England ....................... 341/22 |
| 2009/0168317 | A1 | * | 7/2009 | Wang et al. ............. 361/679.09 |
| 2009/0312076 | A1 | * | 12/2009 | Lim .......................... 455/575.4 |

\* cited by examiner

*Primary Examiner*—Jayprakash N Gandhi
*Assistant Examiner*—Anthony M Haughton
(74) *Attorney, Agent, or Firm*—Zhigang Ma

(57) ABSTRACT

An electronic device includes a bottom cover, and a display unit, a main keyboard, and at least one secondary keyboards mounted on the bottom cover respectively. The bottom cover defines a first guiding slot. The display unit defines at least one second guiding slot. The second guiding slot crosses the first guiding slot and an angle between the first guiding slot and the second guiding slot is less than 90 degrees. Each of the secondary keyboard includes a positioning shaft passing through the first guiding slot and one of the second guiding slot. When the electronic device is closed, the main keyboard and the secondary keyboard are positioned between the display unit and the bottom cover. When the electronic device is opened, the second guiding slot drives the positioning shaft to slide along the first guiding slot, thus to expose the secondary keyboard and the main keyboard accordingly.

7 Claims, 7 Drawing Sheets

ELECTRONIC DEVICE WITH SLIDABLE KEYBOARD

BACKGROUND

1. Technical Field

The present disclosure relates to an electronic device with a slidable keyboard.

2. Description of Related Art

Electronic devices with slidable covers, such as mobile phones, usually include keyboards concealed when unused. Parts of the electronic devices, such as slidable covers, can be slid away to expose the keyboards for use. Some electronic devices have a plurality of keyboards stacked therein, the slidable covers can slide away along a plurality of directions correspondingly to expose different keyboards. However, those slidable covers can only slide away along one direction at a time, and when such a slidable cover slides away along a first direction, a first keyboard is exposed, a second direction a second keyboard, and so on. Thus, the slidable cover must slide away multiple times to expose all the keyboards.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
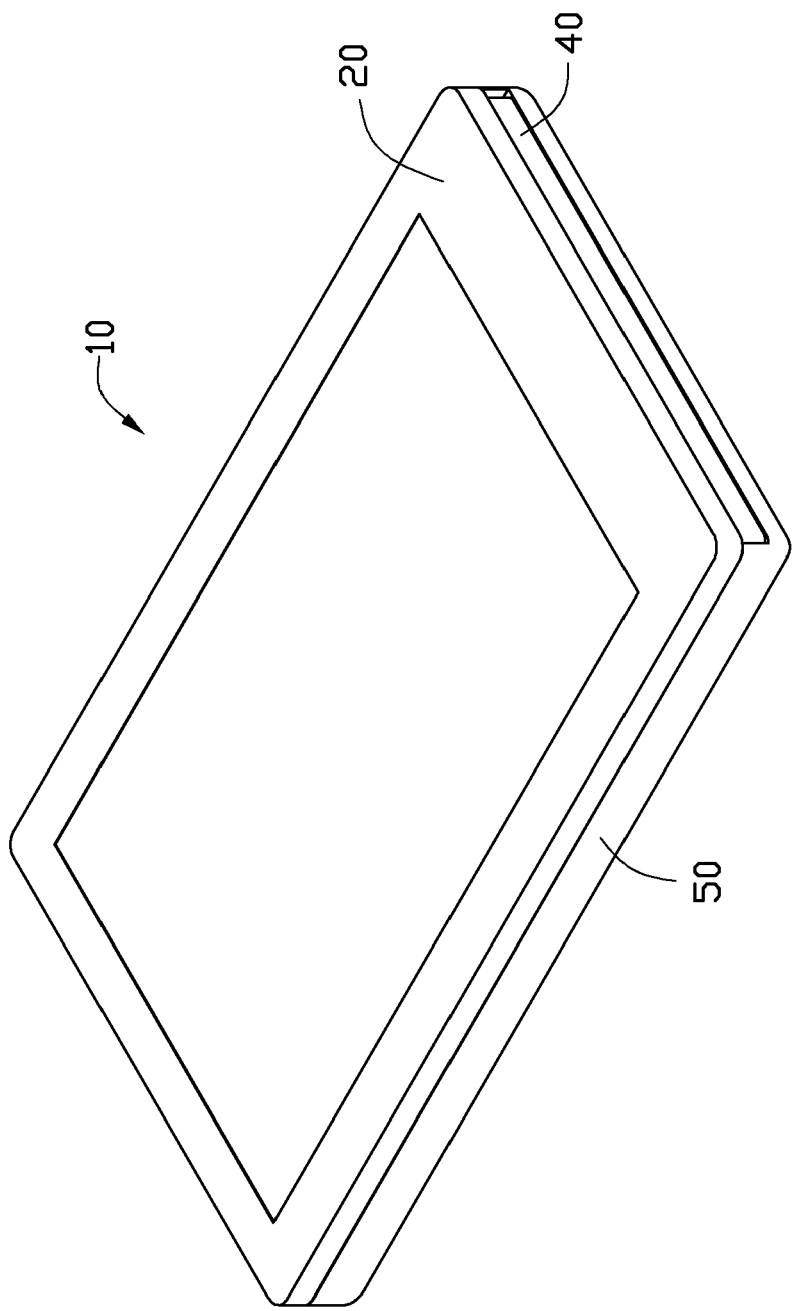
FIG. 1 is a schematic, isometric view of an electronic device according to an exemplary embodiment.
Figure 2:
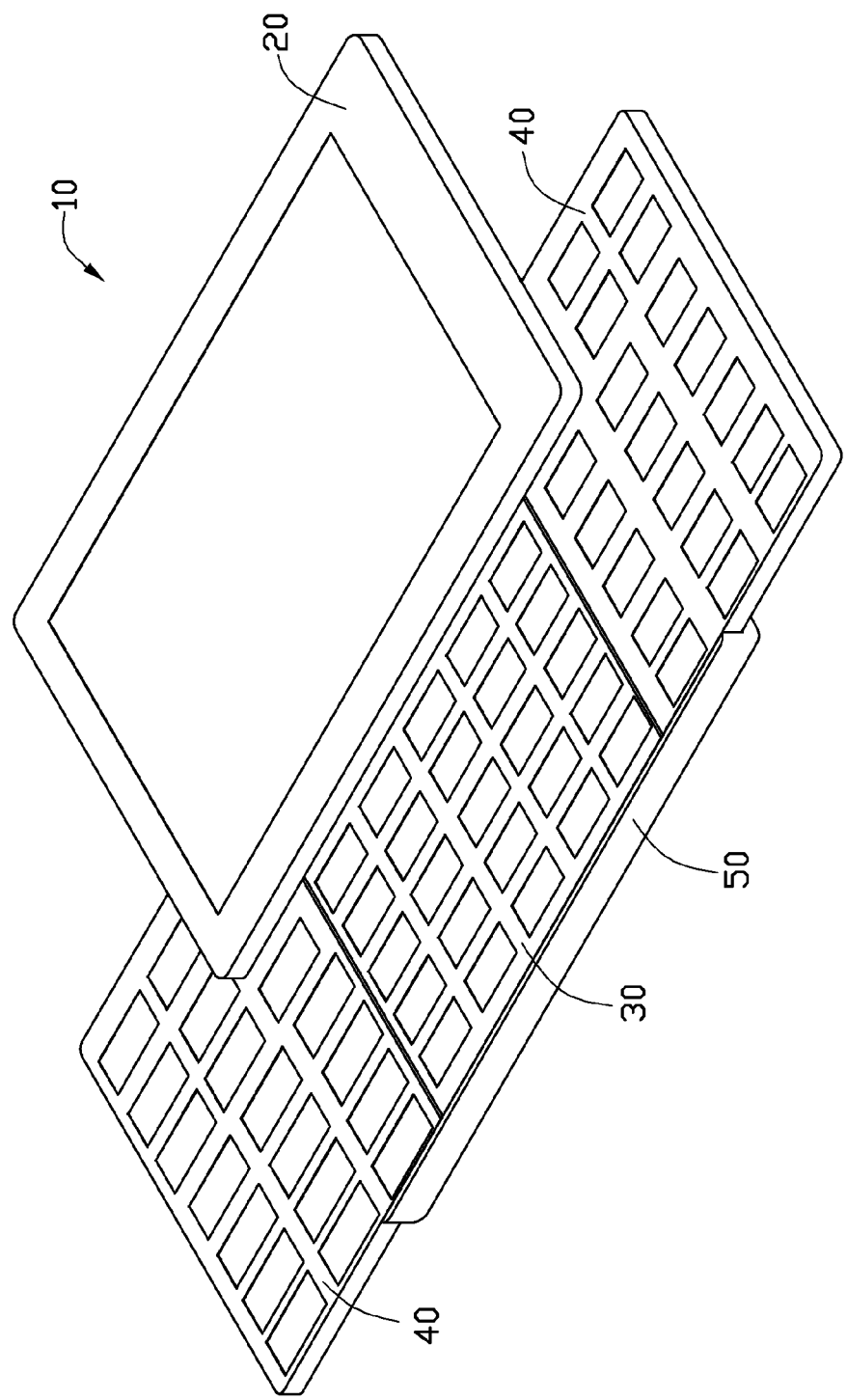
FIG. 2 is a schematic, isometric view of the electronic device of FIG. 1 in an open state.
Figure 3:
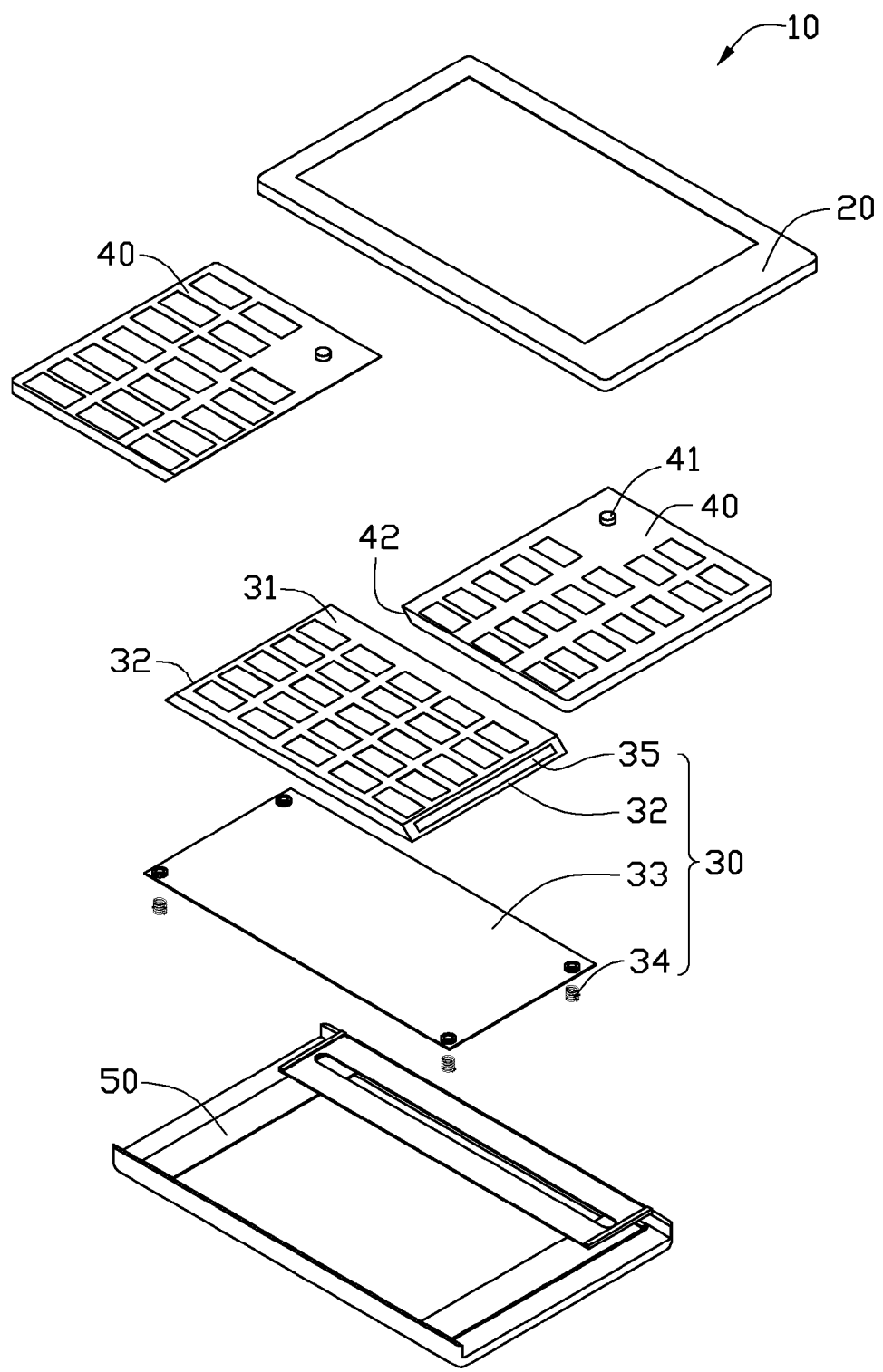
FIG. 3 is an exploded view of the electronic device of FIG. 1.
Figure 4:
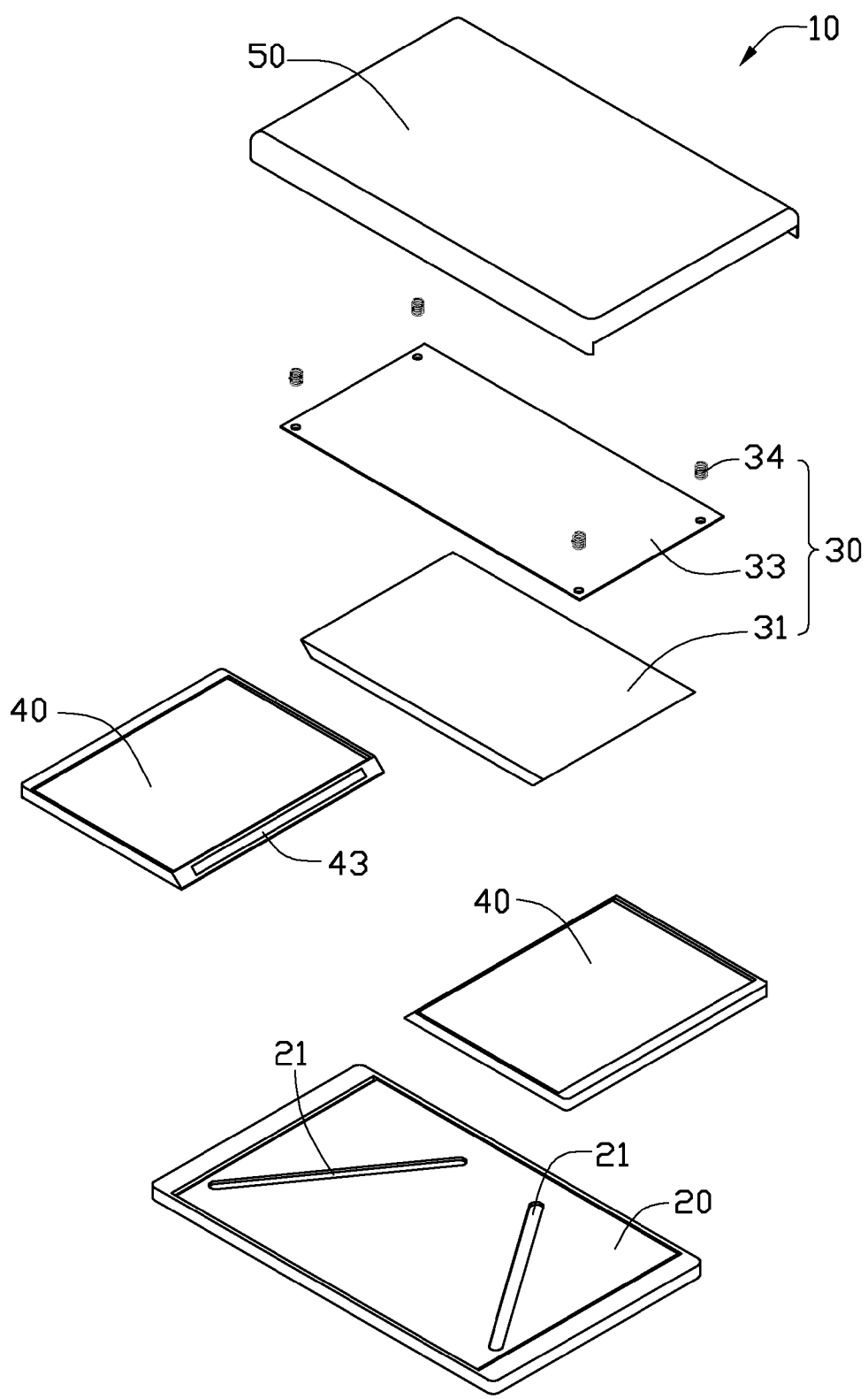
FIG. 4 is similar to FIG. 3, but viewed from a reversed perspective.

Referring to FIGS. 1 and 2, an electronic device 10 according to an exemplary embodiment is disclosed. The electronic device 10 includes a display unit 20, a main keyboard 30, at least one secondary keyboard 40, and a bottom cover 50. In this embodiment, there have two secondary keyboards 40. The main keyboard 30 and the secondary keyboards 40 are mounted on the bottom cover 50. The display unit 20 is slidably mounted on the bottom cover 50 and is positioned above the main keyboard 30 and the secondary keyboards 40. Referring to FIG. 1, when the electronic device 10 is in a first/closed state, the display unit 20 covers the bottom cover 50, the main keyboard 30 (invisible in FIG. 1) and the secondary keyboards 40 are positioned between the display unit 20 and the bottom cover 50. Referring to FIG. 2, when the electronic device 10 is in an opened state, the display unit 20 is substantially moved away from the bottom cover 50, the main keyboard 30 is exposed, and the secondary keyboards 40 is slid out of the bottom cover 50 correspondingly.

Figure 5:
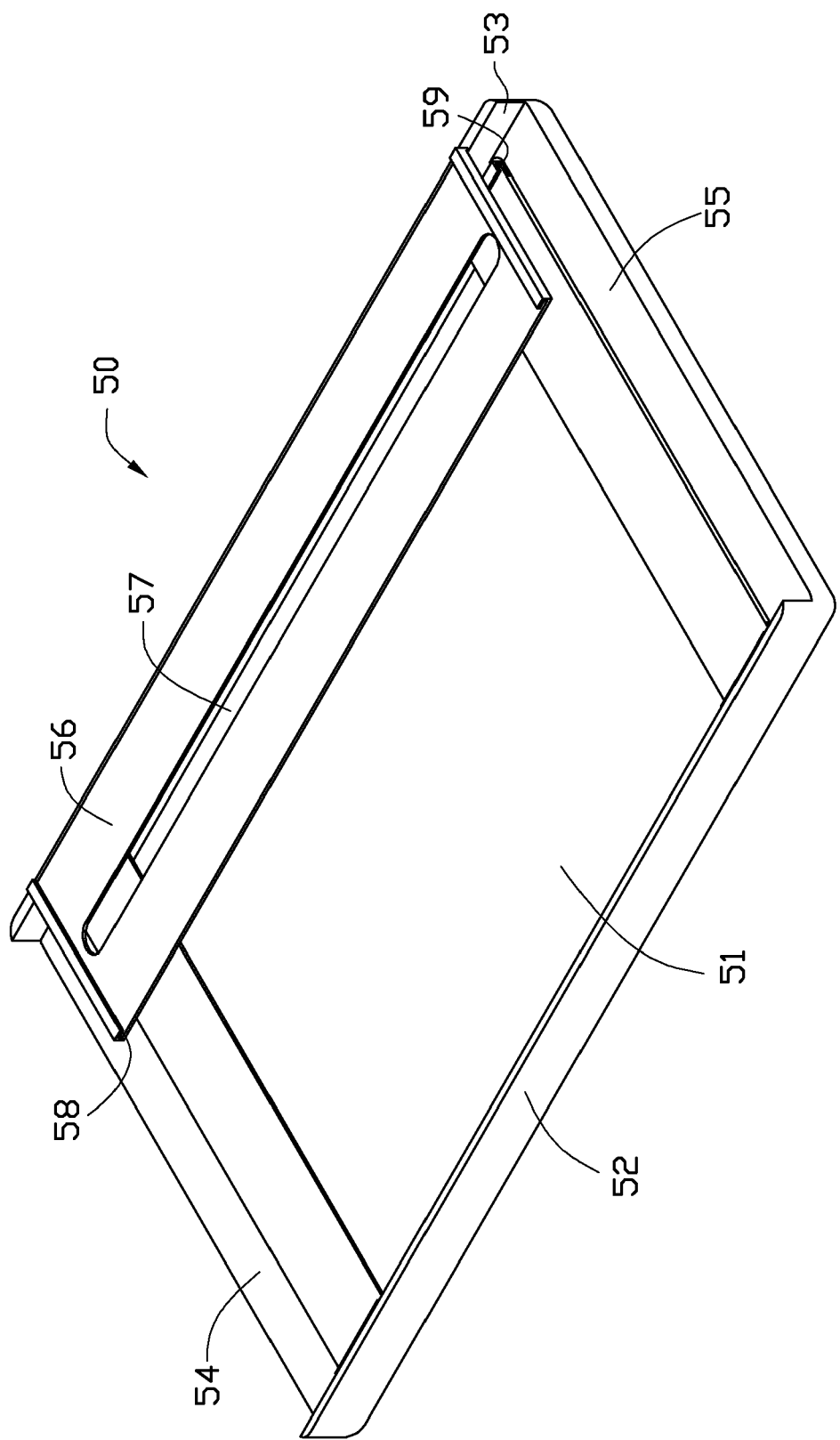
FIG. 5 is a schematic, isometric view of a bottom cover of the electronic device of FIG. 1.

Referring to FIG. 5, the bottom cover 50 includes a bottom wall 51, a front sidewall 52, a back sidewall 53, a left sidewall 54, and a right sidewall 55. The front sidewall 52, the back sidewall 53, the left sidewall 54, and the right sidewall 55 extend upwardly from edges of the bottom wall 51. The front sidewall 52 and the back sidewall 53 are higher than the left sidewall 54 and the right sidewall 55. The secondary keyboards 40 are positioned above the left sidewall 54 and the right sidewall 55 and are limited between the front sidewall 52 and the back sidewall 53. The bottom wall 51 defines a first slide groove 59. The first slide groove 59 is parallel to the front sidewall 52 and the back sidewall 53. A display support part 56 extends from the back sidewall 53 towards the front sidewall 52. The display support part 56 defines a first guiding slot 57. The first guiding slot 57 is parallel to the front side wall 52 and the back side wall 53. The display support part 56 also defines second slide grooves 58 on two sides thereof. The second slide grooves 58 are parallel to the left sidewall 54 and the right sidewall 55.

Referring to FIGS. 3, 4, 5, and 7, the main keyboard 30 includes a keyboard body 31 and a lever sheet 33. The lever sheet 33 is mounted in the bottom cover 50 via elastic pieces 34, and can be pressed. The keyboard body 31 is fixed on the lever sheet 33. Two ends of the lever sheet 33 extend from two ends of the keyboard body 31 correspondingly. Two ends of the keyboard body 31 have inclined surfaces 32. Magnets 35 are mounted on the inclined surfaces 32. Each of the secondary keyboards 40 include a positioning shaft 41. The secondary keyboards 40 further include inclined surfaces 42 slanted in a compensating direction corresponding to the inclined surfaces 32 of the main keyboard 30. A magnets 43 is mounted on the inclined surface 42. The secondary keyboards 40 are positioned in the bottom cover 50 and are slidable along the first slide groove 59.

The display unit 20 defines two second guiding slots 21. The second guiding slots 21 cross the first guiding slot 57. An angle α between the first guiding slot 57 and the second guiding slots 21 is less than 90 degrees. The display unit 20 is mounted on the display support part 56 and is slidable along the second slide grooves 58. The positioning shafts 41 of the secondary keyboards 40 pass through the first guiding slot 57 and the second guiding slots 21.

Figure 7:
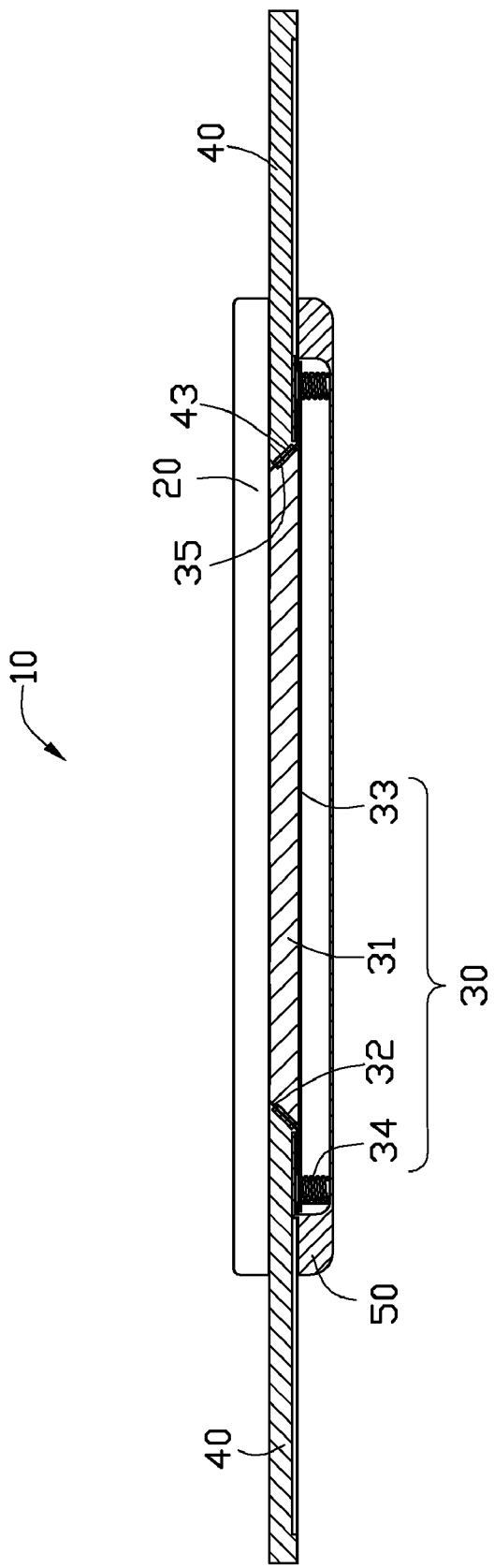
FIG. 7 is a section view along line VII-VII of FIG. 6.

Referring to FIGS. 1 and 7, when the electronic device 10 is in a closed state, the elastic pieces 34 are compressed, the main keyboard 30 is adjacent a bottom of the bottom cover 50, the secondary keyboards 40 are above the main keyboard 30, and the display unit 20 is above the secondary keyboards 40. In this way, the total occupying space of the electronic device 10 is minimized.

Figure 6:
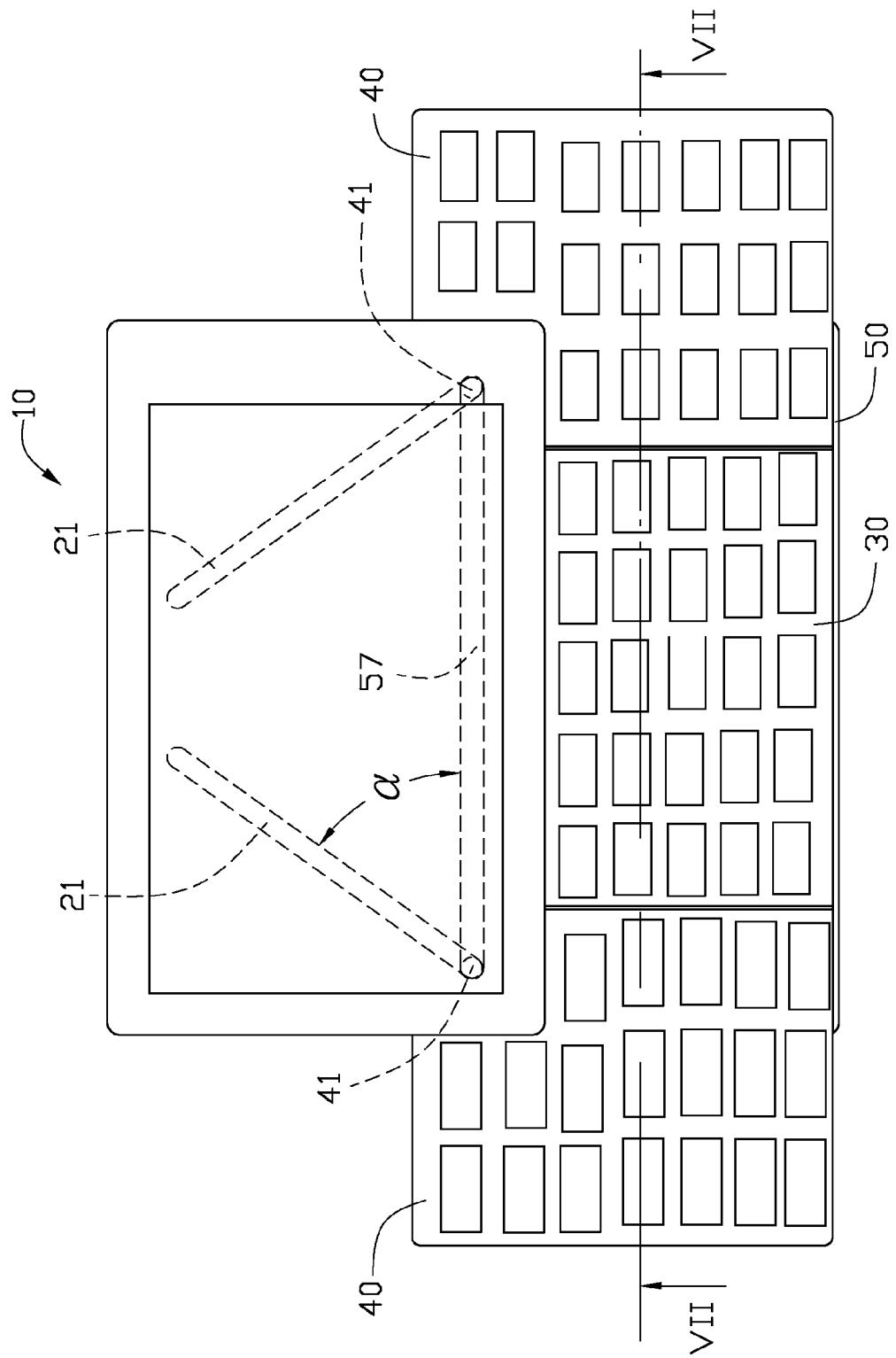
FIG. 6 is a top view of FIG. 2.

Referring to FIGS. 6 and 7, when the electronic device 10 changes from the closed state to the opened state, the display unit 20 slid away form the front sidewall 52 on the bottom cover 50. The second guiding slots 21 drive the positioning shafts 41 of the secondary keyboards 40 to move to two ends of the first guiding slot 57 correspondingly, thus exposing the secondary keyboards 40. When the secondary keyboards 40 are fully exposed, the elastic pieces 34 returns to normal and drive the main keyboard 30 to move up till the lever sheet 33 abuts the secondary keyboards 40. The inclined surfaces 32, 42 contact to each other. The magnets 35 of the main keyboard 30 attract the magnets 43 of the secondary keyboards 40, thus connecting the main keyboard 30 to the secondary keyboards 40. The main keyboard 30 and the secondary keyboards 40, being substantially coplanar, are exposed and can be operated.

When the electronic device 10 begin to close, the second guiding slots 21 of the display unit 20 drive the positioning shafts 41 to move towards a middle part of the guiding slot 57, the secondary keyboards 40 slides following the positioning shafts 41, and the inclined surface 42 of the secondary keyboards 40 drive the main keyboard 30 to move down till the display unit 20 and the secondary keyboards 40 are entirely concealed.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
    a bottom cover defining a first guiding slot;
    a display unit slidably mounted on the bottom cover, defining at least one second guiding slot, wherein the second guiding slot crosses the first guiding slot and an angle between the first guiding slot and the second guiding slot is less than 90 degrees;
    a main keyboard mounted in the bottom cover; and
    at least one secondary keyboard slidably mounted in the bottom cover, each comprising a positioning shaft passing through the first guiding slot and one of the at least one second guiding slot; wherein
    when the electronic device is closed, the display unit is disposed on the bottom cover, the main keyboard and the at least one secondary keyboard are positioned between the display unit and the bottom cover; and
    when the electronic device is opened, the display unit slide away from the bottom cover, the at least one second guiding slot drives the positioning shaft of each of the at least one secondary keyboard to slide along the first guiding slot, thus to expose the at least one secondary keyboard and the main keyboard accordingly.

2. The electronic device of claim 1, wherein the number of the at least one secondary keyboard is two and the two secondary keyboards are symmetrically mounted in the bottom cover, and the two secondary keyboards move to opposite directions when the electronic device is opened.

3. The electronic device of claim 1, further comprising elastic pieces mounted between the main keyboard and the bottom cover, wherein the elastic pieces are compressed and the at least one secondary keyboard is positioned above the main keyboard when the electronic device is closed, the elastic pieces are restored and drive the main keyboard to move up to be substantially coplanar with the at least one secondary keyboard when the electronic device is opened.

4. The electronic device of claim 3, wherein the main keyboard defines first inclined surfaces, the at least one secondary keyboard defines second inclined surfaces slanted in a compensating direction corresponding to the first inclined surfaces, the first inclined surfaces contact to the second inclined surfaces when the electronic device is opened, the second inclined surfaces of the at least one secondary keyboard drives the main keyboard to move down when the electronic device is closed.

5. The electronic device of claim 3, wherein the main keyboard comprises lever sheet for abuts the at least one secondary keyboard after the electronic device is opened and the main keyboard is moved up.

6. The electronic device of claim 5, wherein ends of the lever sheet extends from other part of the main keyboard, and the at least one secondary keyboard is positioned above the end of the lever sheet, and wherein the lever sheet is mounted on the bottom cover via the elastic members.

7. The electronic device of claim 4, further comprising magnets mounted on the first inclined surfaces and the second inclined surfaces.

* * * * *